United States Patent [19]
Bosley

[11] Patent Number: 5,697,848
[45] Date of Patent: Dec. 16, 1997

[54] COMPOUND SHAFT WITH FLEXIBLE DISK COUPLING

[75] Inventor: Robert W. Bosley, Cerritos, Calif.

[73] Assignee: Capstone Turbine Corporation, Tarzana, Calif.

[21] Appl. No.: 440,541

[22] Filed: May 12, 1995

[51] Int. Cl.$^6$ .............................................. F16D 3/76
[52] U.S. Cl. .................... 464/98; 415/216.1; 464/182
[58] Field of Search .................... 464/98, 51, 179, 464/180, 182, 183; 74/607; 415/216.1; 416/244 R, 244 A; 417/423.7, 423.1, 423.6

[56] References Cited

U.S. PATENT DOCUMENTS

| | | |
|---|---|---|
| 1,283,787 | 6/1918 | Jencick . |
| 1,460,212 | 6/1923 | Olive ............................ 464/98 |
| 2,300,689 | 11/1942 | Nagle ........................ 415/216.1 X |
| 2,483,616 | 10/1949 | Bergstedt ..................... 464/179 X |
| 2,625,883 | 1/1953 | Howser ..................... 415/216.1 X |
| 2,848,882 | 11/1958 | Larsen et al. . |
| 3,299,722 | 1/1967 | Bodine, Jr. . |
| 3,448,591 | 6/1969 | Spyra . |
| 3,500,754 | 3/1970 | Boes et al. . |
| 3,635,050 | 1/1972 | Plummer ........................ 464/98 |
| 3,779,451 | 12/1973 | Lehman . |
| 3,788,099 | 1/1974 | Miller ............................ 464/98 |
| 3,791,169 | 2/1974 | Wright . |
| 3,834,183 | 9/1974 | Muller ........................... 464/51 |
| 3,855,817 | 12/1974 | Stuemky et al. ................... 464/51 |
| 3,902,333 | 9/1975 | Dossier ......................... 464/182 |
| 3,973,867 | 8/1976 | Lee ........................... 415/216.1 X |
| 4,044,628 | 8/1977 | Jacks ............................. 464/98 |
| 4,121,532 | 10/1978 | Coryell ......................... 464/182 |
| 4,125,344 | 11/1978 | Tiefenbacher ................ 416/244 A X |
| 4,176,519 | 12/1979 | Kronogard . |
| 4,230,438 | 10/1980 | Lehmann et al. ............... 415/216.1 |
| 4,407,631 | 10/1983 | Schneider et al. ........... 415/216.1 X |
| 4,659,245 | 4/1987 | Hirao et al. ................ 416/244 A X |
| 4,795,012 | 1/1989 | Durum . |
| 4,934,138 | 6/1990 | Boyd . |
| 5,577,963 | 11/1996 | Stretch ........................... 464/51 |

FOREIGN PATENT DOCUMENTS

| | | | |
|---|---|---|---|
| 57-171122 | 10/1982 | Japan | ................... 464/180 |

*Primary Examiner*—Daniel P. Stodola
*Assistant Examiner*—Eileen A. Dunn
*Attorney, Agent, or Firm*—Albert J. Miller

[57] ABSTRACT

A compound shaft for a three journal bearing turbomachine which includes a first stiff shaft supported by two journal bearings, a second stiff shaft supported by one journal bearing and by one bi-directional thrust bearing, and a flexible disk shaft that operably connects the first and second stiff shafts. The flexible disk shaft utilizes a flexible disk to function as a low hysterisis joint in parallel with a non-linear trunion clock spring such that the flexible disk shaft transfers overturning support from the first stiff shaft to the second stiff shaft and transfers thrust bearing support from the second stiff shaft to the first stiff shaft. The flexible disk shaft allows the compound shaft to tolerate extremely large misalignments of the three journal bearings from a straight line axis. The dynamic characteristics of the compound shaft (especially the axial location of the flexible disk of the flexible disk shaft) are utilized to tune the frequencies of the turbomachine's rigid body and flexural criticals. All rigid body critical frequencies can be set below twenty percent of the machine's maximum operating speed and all flexural critical frequencies can be set more than thirty five percent above the turbomachine's maximum operating speed.

50 Claims, 8 Drawing Sheets

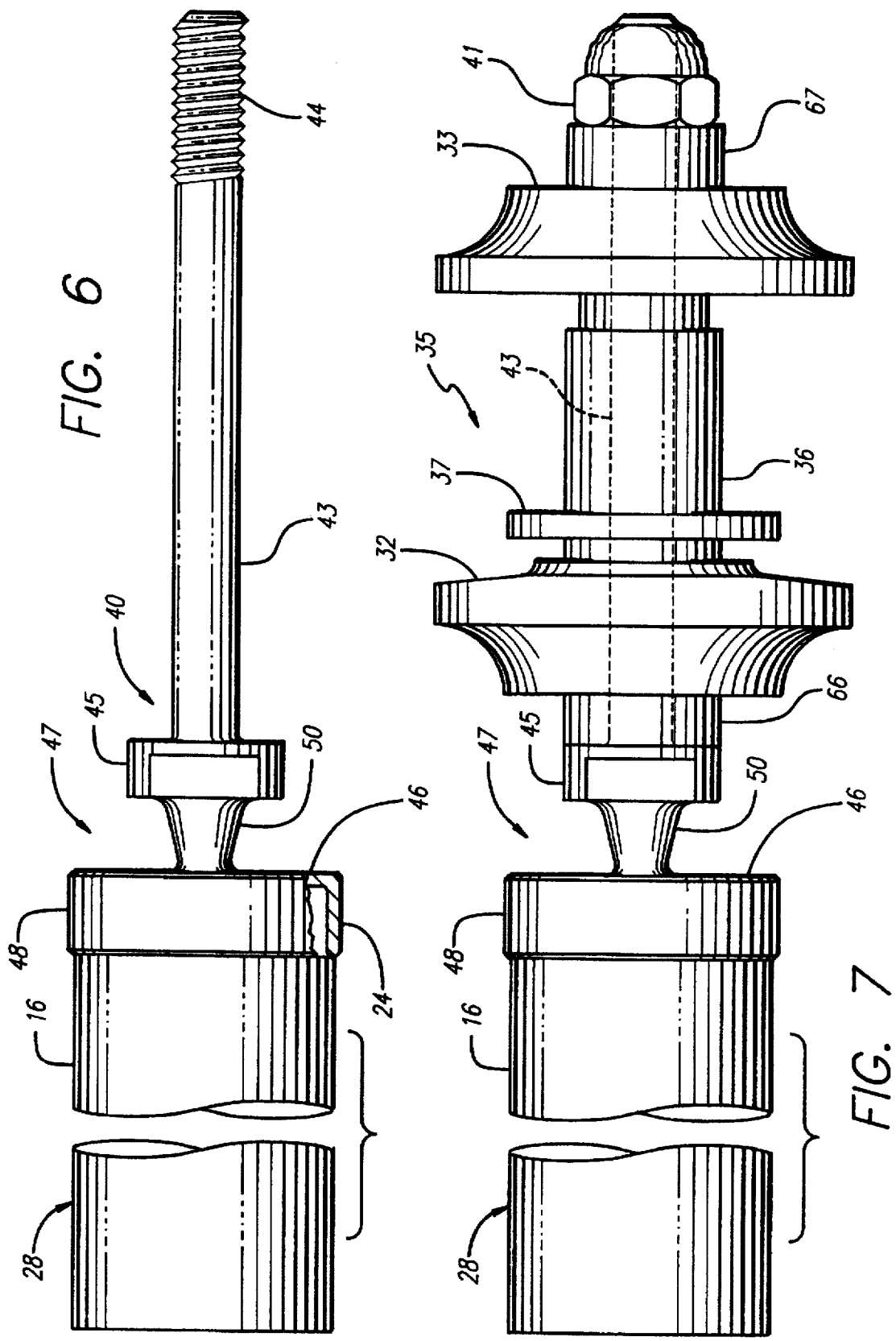

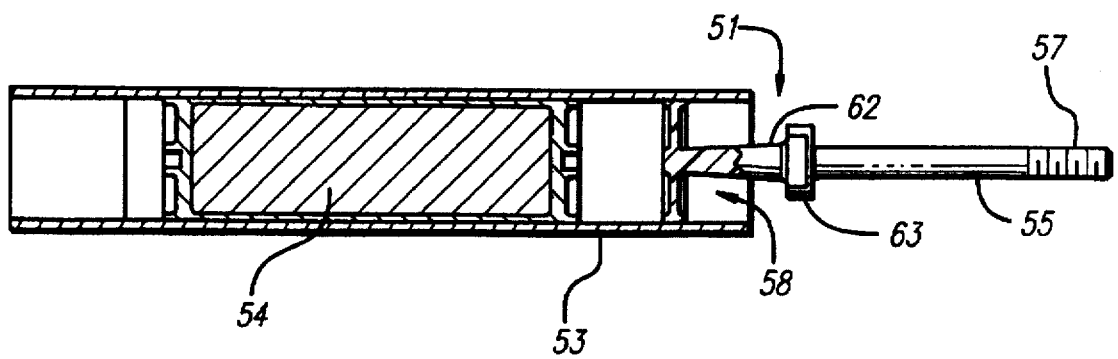
FIG. 11
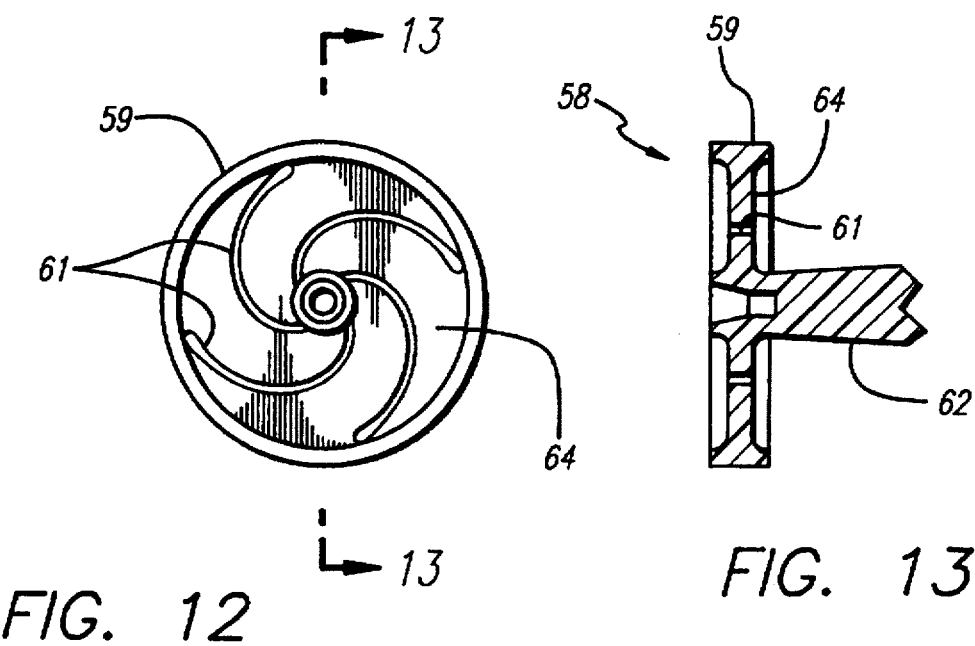
FIG. 12
FIG. 13
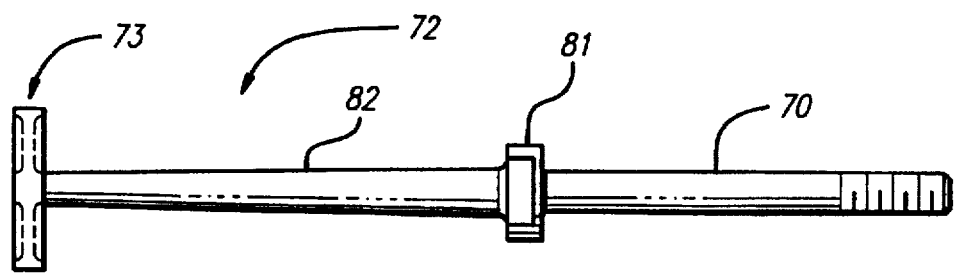
FIG. 14

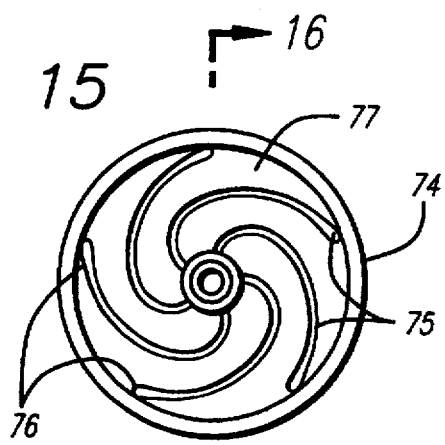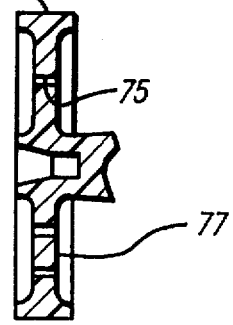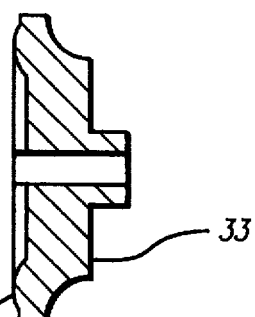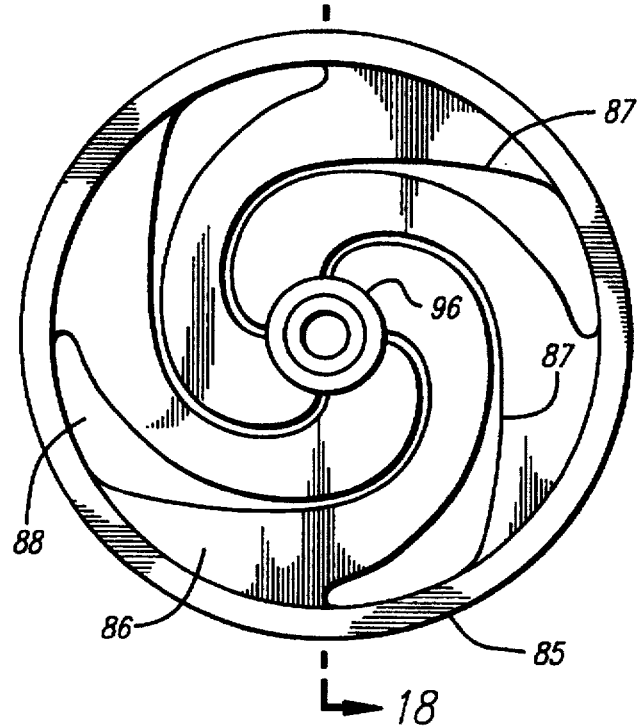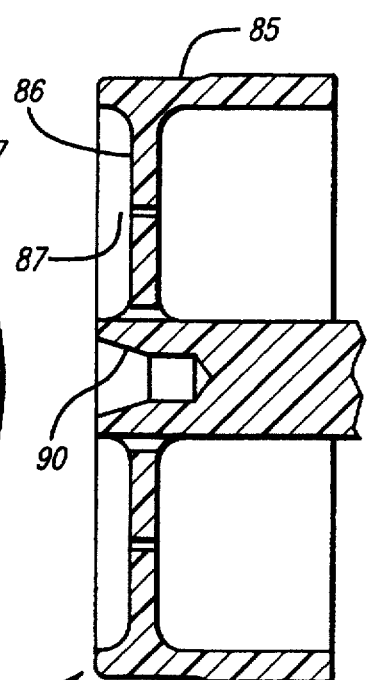

COMPOUND SHAFT WITH FLEXIBLE DISK COUPLING

TECHNICAL FIELD

This invention relates to the general field of shafts for rotating machinery and more particularly to an improved compound shaft that includes a flexible disk shaft and two relatively rigid or stiff shafts which together form the compound shaft.

BACKGROUND OF THE INVENTION

In rotating machinery, various rotating elements such as compressor wheels, turbine wheels, fans, generators, and motors are affixed to a shaft upon which they rotate. The shaft can be a single piece unitary structure of nearly constant diameter or it can be a compound structure having two or more relatively rigid or stiff shaft elements connected by one or more relatively flexible shaft elements. A single piece shaft machine would typically have its shaft supported by two journal bearings and a bi-directional thrust bearing. A two stiff shaft element compound shaft machine would typically have each of its stiff shaft elements supported by two journal bearings (for a total of four journal bearings) and would have either one or two bi-directional thrust bearings (two thrust bearings being required if the relatively flexible shaft element is unable to transmit axial loads). The rotating machinery industry generally considers that it is impractical to support high speed turbomachinery shafts of either the single piece or compound type on three journal bearings owing to the difficulty of holding three bearings in straight alignment, together with the large shaft and bearing stresses that result when bearing misalignment occurs.

As a turbomachine is accelerated, the shaft and the rotating elements affixed to it pass through rigid body and flexural critical resonant frequencies or criticals. For the purpose of this disclosure, rigid body criticals will be defined as those rotor resonances where a single piece shaft or the stiff shafts of a compound shaft deflect within the compliant mounting of the journal bearings but do not bend. This definition allows for bending of the flexible shaft element of a compound shaft due to rigid body critical rotor resonances. Flexural criticals are herein defined as those rotor resonances where a single piece shaft or the stiff shafts of a compound shaft bend.

Imbalances in the rotor assembly cause the shaft to deflect from its straight line axis as it passes through these criticals. This deflection can induce rotor assembly rubbing, shaft stresses and bearing stresses that exceed design limits and cause hardware damage. These problems are most serious when a flexural critical must be negotiated since: 1) flexural criticals typically occur at higher rotor speeds than rigid body criticals; 2) high speed criticals store more resonant energy that must be damped by the turbomachine's bearings and suspensions than do low speed criticals; 3) rigid body criticals store most of their potential energy in the deflections of the springs in the bearings and suspensions where it is available for damping; and 4) flexural criticals store most of their potential energy in the deflections of the spring-like shafts where it is not available for damping by the bearings and suspensions. Thus, the bearings and suspensions used in turbomachinery typically have difficulty in damping a flexural critical. These problems are further exacerbated when the turbomachinery utilizes conventional compliant foil hydrodynamic fluid film bearings (e.g., air bearings) since conventional bearings of this type typically have soft spring properties and poor damping properties. For these reasons, when designing a turbomachine, it is highly desirable to assure that no flexural critical frequencies occur below the turbomachine's maximum operating speed (and thus need to be balanced and negotiated) and to assure that all negotiated rigid body critical frequencies are well below the turbomachine's minimum normal operating speed.

When determining the operating speed, shaft diameter, and shaft length of a turbomachine, the following factors and relations must be considered:

The electric power capability of a motor or generator of a given type and given magnetic flux density is proportional to the length of the magnetic rotor times the square of the diameter of the magnetic rotor times the rotor speed;

The centrifugal stresses induced in any rotating element of a turbomachine having relative dimensions and materials held constant are proportional to the square of shaft speed times the square of the diameter of that element; and The frequency of any flexural critical for a simple shaft is proportional to the first power of its diameter and inversely proportional to the square of its length.

These and other relations produce the following observations:

High power turbomachines must operate at lower speeds than low power turbomachines;

Turbomachines with many rotating elements (compressors, turbines, fans, generators, motors, etc.) will require shafts that are longer than turbomachines with only a few rotating elements;

A turbomachine having only two rotating elements (e.g., one compressor wheel and one turbine wheel) may be able to utilize a single piece shaft of nearly constant diameter supported by two spaced journal bearings and have it first flexural critical speed occur above operating speed and thus not require negotiation of the first flexural critical or maybe not even require assembly balancing of that critical; and A turbomachine having three rotating elements (e.g., one compressor wheel, one turbine wheel and a motor/generator) is very unlikely to be able to utilize a single piece unitary shaft of nearly constant diameter supported by two spaced journal bearings and have its first flexural critical frequency occur above operating speed. Such a turbomachine is likely to require a compound shaft to assure that the first flexural critical frequency is above the turbomachine's maximum operating speed.

When high speed turbomachinery utilizes single piece shafts supported by two journal bearings, it is common for the highest frequency rigid body critical to occur at a relatively high percentage of operating speed (e.g., 30% to 50%) and for the first flexural critical to be near operating speed (e.g., 75% to 125% of operating speed). The ratio of the frequency of the first flexural critical to the frequency of the last rigid body critical is typically low (e.g., slightly over 2:1). If the first flexural critical is in fact below operating speed and must be negotiated, it will be poorly damped and will require careful balancing of the turbomachine as an assembly. It is highly desirable for the first flexural critical to be above operating speed, but this is not always possible with single piece shafts that must be long to accommodate the various rotating elements that must be affixed thereon (compressor wheels, turbine wheels, fans, generators, motors, etc.).

When high speed turbomachinery utilizes two piece compound shafts supported by four journal bearings and one or two bi-directional thrust bearings and utilizes a lightweight shaft with two universal joints to connect the two stiff shafts, machine length can be excessively long and machine complexity and costs can be high.

For turbomachines with three rotating elements, the problems of single piece shafts supported by two journal bearings and the problems of compound shafts supported by four journal bearings can be avoided by utilizing a compound shaft supported by three journal bearings.

SUMMARY OF THE INVENTION

In the present invention, the compound shaft generally comprises a first stiff shaft rotatably supported by a pair of journal bearings, a power head shaft or second stiff shaft rotatably supported by a single journal bearing and by a bi-directional thrust bearing, and a flexible disk shaft. The flexible disk shaft, which includes the tie rod upon which the second stiff shaft, including the compressor wheel, bearing rotor, and turbine wheel, is removably mounted, is coupled with an interference fit to the first stiff shaft by a flexible disk and quill shaft which prevents translational or rotational movement between the first and second stiff shafts and yet permits flexure of the second stiff shaft with respect to the first stiff shaft.

In one embodiment, a generally cup-shaped flexible disk member and short quill shaft are at one end of the flexible disk shaft. The cup-shaped flexible disk member interference fits over the corresponding end of the first stiff shaft which may be a sleeve enclosing a permanent magnet. A plurality of spaced holes or slots are included in the base or disk of the cup-shaped flexible disk to control the spring rate of the compound shaft or the flexible disk may have a tapered thickness. In other embodiments, the flexible disk interference fits within the sleeve of the first shaft enclosing the permanent magnet.

A compound shaft for a three journal bearing turbomachine is disclosed which includes a first stiff shaft supported by two journal bearings, a second stiff shaft supported by one journal bearing and by one bi-directional thrust bearing and a flexible disk shaft that connects the first and second stiff shafts. The flexible disk shaft, which operably connects the first and second stiff shafts, utilizes a metal flexure disk to function as a low hysterisis joint in parallel with a non-linear trunnion clock spring. The flexible disk shaft transfers overturning support from the first stiff shaft to the second stiff shaft and transfers thrust bearing support from the second stiff shaft to the first stiff shaft. The flexible disk shaft allows the compound shaft to tolerate extremely large misalignments of the three journal bearings from a strait line axis. The dynamic characteristics of the compound shaft (especially the axial location of the flexible disk) are utilized to tune the frequencies of the turbomachine's rigid body and flexural criticals. All rigid body critical frequencies can be set below twenty percent of the machine's maximum operating speed. All flexural critical frequencies can be set more than thirty five percent above the machine's maximum operating speed. When the compound shaft is supported by compliant foil hydrodynamic fluid film bearings (both journal and thrust), all negotiated rotor criticals can be extremely well damped (dimensionless damping coefficient Q of less than 2.5) and all criticals (both negotiated rigid body criticals and unnegotiated flexural criticals) need not be balanced.

The first stiff shaft can be a hollow sleeve with a magnet for a permanent magnet motor/generator mounted therein. This permanent magnet shaft can have its sleeve's outer diameter serve as both the motor/generator rotor outer diameter and as the rotating surface for the two spaced compliant foil hydrodynamic fluid film journal bearings mounted at the ends of the permanent magnet shaft. The permanent magnet shaft can have hollow ends for lightening and to induce cooling air flow. The hollow end of the first stiff shaft nearest the flexible disk shaft can have a stiffening sleeve inserted thereinto to increase the frequency of the first flexural critical. An inertial mass ring can be attached to the compound shaft at the axial location of a node for a flexural critical (e.g., through the back plane of a turbine wheel) to increase the frequency of that critical.

It is therefore a principal object of the present invention to provide an improved compound shaft for a turbomachine.

It is another object of the present invention to provide such a compound shaft with the ability to function without being radially supported by four journal bearings.

It is another object of the present invention to provide such a compound shaft with the ability to function without being axially supported by two bi-directional thrust bearings.

It is another object of the present invention to provide such a compound shaft with the ability to function while being radially supported by three journal bearings.

It is another object of the present invention to provide such a compound shaft with the ability to function while being axially supported by one bi-directional thrust bearing.

It is another object of the present invention to provide such a compound shaft with the ability to function when the three journal bearings providing radial support for the compound shaft are significantly misaligned radially (not in a straight line).

It is another object of the present invention to provide such a compound shaft with a first relatively rigid or stiff shaft that is supported by a spaced pair of journal bearings and a second relatively rigid or stiff shaft that is radially supported by a single journal bearing and a single bi-directional thrust bearing.

It is another object of the present invention to provide such a compound shaft with a flexible disk shaft to flexibly couple the first stiff shaft and the second stiff shaft.

It is another object of the present invention to utilize the flexible disk shaft to provide the second stiff shaft (which is supported directly by only one journal bearing) with overturning support by coupling the second stiff shaft to the journal bearing supporting the nearest end of the first stiff shaft.

It is another object of the present invention to utilize the flexible disk shaft to provide the first stiff shaft (which does not have a thrust bearing) with axial support by coupling the first stiff shaft to the bi-directional thrust bearing supporting the second stiff shaft It is another object of the present invention to utilize the flexible disk shaft to transfer torque from the first stiff shaft (including the motor/generator rotor) to the second stiff shaft (including the compressor wheel and turbine wheel) when the turbogenerator is started and to transfer torque from the second stiff shaft to the first stiff shaft when the turbogenerator is producing electrical power.

It is another object of the present invention to provide such a compound shaft with a flexible disk shaft that utilizes metal flexures rather than rotating or sliding joints so as to avoid hysteritic or "slip-sticktion" force and torque variations and to avoid wear when the compound shaft rotates under conditions where the two stiff shafts have spin axes that are not co-linear (they are relatively mis-aligned).

It is another object of the present invention to provide such a compound shaft with a flexible disk shaft which achieves most of its flexibility by trunnion deflections of the flexible disk shaft over a short axial length along the flexible disk shaft's spin axis.

It is another object of the present invention to provide such a compound shaft with a flexible disk shaft that has a soft spring rate (e.g., in units of pound-inch per radian) for any trunnion or overturning deflections across the flexible disk.

It is another object of the present invention to provide such a compound shaft with a flexible disk shaft having a stiff translational spring rate (e.g., in units of pounds per inch) for any deflections across the flexible disk in a plane normal to the flexible disk shaft's spin axis It is another object of the present invention to provide such a compound shaft with a flexible disk shaft that can transfer axial loads across the flexible disk.

It is another object of the present invention to provide such a compound shaft with a flexible disk shaft that has a moderate to high axial spring rate for any axial deflections across the flexible disk that are along the flexible disk shaft's spin axis.

It is another object of the present invention to provide such a compound shaft with a flexible disk shaft that can be attached to the first stiff shaft by interference fit assemble processes and can be attached to the second stiff shaft by a threaded attachment.

It is another object of the present invention to adjust the mass and spring characteristics of such a compound shaft and, more specifically, to shift the axial location of the flexible disk member in order to shift or tune the turbomachine rotating assembly's rigid body and flexural critical frequencies.

It is another object of the present invention to utilize the dynamic characteristics of such a compound shaft to reduce the frequencies of all rotating assembly rigid body criticals as compared to the frequencies inherent to an equivalent size single piece shaft supported by two journal bearings.

It is another object of the present invention to utilize the dynamic characteristics of such a compound shaft to decrease the frequencies of all rotating assembly rigid body criticals to well below the minimum operating speed of the turbomachine.

It is another object of the present invention to utilize the dynamic characteristics of such a compound shaft to decrease the frequencies of all rotating assembly rigid body criticals to such a low value that the bearings/suspensions can effectively damp these criticals and render these criticals easily balanced or not requiring balancing.

It is another object of the present invention to utilize the dynamic characteristics of such a compound shaft with a short quill shaft to increase the frequencies of all rotating assembly flexural criticals as compared to the frequencies inherent to an equivalent size single piece shaft supported by two journal bearings.

It is another object of the present invention to utilize the dynamic characteristics of such a compound shaft with a short quill shaft to increase the frequency of the rotating assembly's first flexural critical substantially above the turbomachine's maximum operating speeds so that this first flexural critical need never be negotiated and need never be balanced.

It is another object of the present invention to utilize the dynamic characteristics of such a compound shaft with a long quill shaft to decrease the frequency of the rotating assembly's first flexural critical as compared to the frequency inherent to an equivalent size single piece shaft supported by two journal bearings.

It is another object of the present invention to utilize the dynamic characteristics of such a compound shaft with a long quill shaft to decrease the frequency of the rotating assembly's fast flexural critical to well below the minimum operating speed of the turbomachine and such a low value that the bearings/suspensions can effectively damp this first flexural critical and render this critical easily balanced and easily negotiated.

It is another object of the present invention to utilize the dynamic characteristics of such a compound shaft to cause the frequency of the lowest un-negotiated critical above the maximum operating speed to be nearly eight times the frequency of the highest negotiated critical below maximum operating speed.

It is another object of the present invention to utilize the dynamic characteristics of such a compound shaft to allow the turbomachine to operate over a speed range of four to one without encountering a rigid body critical or a flexural critical.

It is another object of the present invention to utilize the dynamic characteristics of such a compound shaft with a short quill shaft to enable the bearings/suspensions to damp the negotiated criticals (all rigid body criticals) so well that the dimensionless damping constant Q for these negotiated criticals will be less that 2.5.

It is another object of the present invention to utilize the dynamic characteristics of such a compound shaft with a short quill shaft to enable the bearings/suspensions to damp the negotiated criticals (all rigid body criticals) so well that the rotating assembly will not need to be balanced as an assembly.

It is another object of the present invention to cause the coupling spring rate transmitted by the flexible disk shaft from the first stiff shaft to the second stiff shaft to be over 100 times the coupling spring rate transmitted by the flexible disk shaft from the second stiff shaft to the first stiff shaft. These coupling spring rates can be determined by attaching one of the stiff shafts to a ground measurement reference, than applying force and measuring the deflection of the other stiff shaft at the axial location of the journal bearing nearest the flexible disk member. In colloquial terms, the first stiff shaft knows that it is supported by two journal bearings but is only moderately aware of the radial movements of the second stiff shaft, while the second stiff shaft thinks that it is supported by two journal bearings but is very aware of the radial movement of the first stiff shaft.

It is another object of the present invention to utilize the flexure characteristics of the flexible disk shaft to tolerate massive mis-alignment of the three journal bearings supporting the compound shaft. The compound shaft can tolerate 100 times the misalignment level tolerable by a solid single piece shaft supported by three journal bearing without exceeding the bearing load limits.

It is another object of the present invention to utilize three journal bearings to support the compound shaft rather than two journal bearings which is conventional to support a single piece shaft or four journal bearings which is conventional to support compound shafts connected by a light shaft having a universal joint attaching it to each of the stiff shafts.

It is another object of the present invention to utilize the axial force transmitting capabilities of the flexible disk shaft to permit the use of only one bi-directional thrust bearing mounted upon only one of the stiff shafts to control the axial position of all shafts of the compound shaft.

It is another object of the present invention to utilize one or more inertial mass rings mounted at relatively large radii on rotating disks (e.g., the turbine back plane) that are located axially near nodes of the first flexural critical to increase the frequency of that critical.

It is another object of the present invention to provide such a compound shaft with the ability to be supported by compliant foil hydrodynamic fluid film journal (radial) bearings and a compliant foil hydrodynamic fluid film thrust bearing and more particularly with the built-in rotating surfaces for these bearings inherent to the compound shaft of the present invention.

It is another object of the present invention to provide such a compound shaft with a first stiff shaft that is comprised of a sleeve that coaxially surrounds and supports a permanent magnet which is itself the rotating element of a permanent magnet motor and/or generator.

It is another object of the present invention to provide such a compound shaft with a first stiff shaft having an outer diameter surface that can function as both the rotating element for two compliant foil hydrodynamic fluid film journal (radial) bearings and as the outer surface of a permanent magnet motor rotor.

It is another object of the present invention to provide such a compound shaft with a first stiff shaft having a stiffening sleeve mounted internally which increases the bending stiffness of the shaft and the frequency of the first flexural critical.

Additional objects and advantages of the present invention will appear from a reading of the following detailed description of the preferred embodiments of the invention taken in conjunction with the appended drawing figures.

BRIEF DESCRIPTION OF THE DRAWINGS

Having described the present invention in general terms, reference will now be made to the accompanying drawings in which:

FIG. 6 is a plan view, partially cut away, of the flexible disk shaft of FIGS. 3-5 interference fit with the permanent magnet shaft of FIG. 2;

FIG. 7 is a plan view of the flexible disk shaft of FIGS. 3-5 interference fit with the permanent magnet shaft of FIG. 2 and having the power head shaft or second stiff shaft removably disposed on the tie rod of the flexible disk shaft;

FIG. 11 is a plan view, partially in section, of an alternate compound shaft of the present invention;

FIG. 12 is an enlarged end view of the flexible disk shaft of FIG. 11;

FIG. 13 is a sectional view of the flexible disk shaft of FIG. 12 taken along line 13—13;

FIG. 14 is a plan view of an alternate flexible disk shaft for the alternate compound shaft of FIG. 11;

FIG. 15 is an enlarged end view of the flexible disk shaft of FIG. 14;

FIG. 16 is a sectional view of the flexible disk shaft of FIG. 15 taken along line 16—16;

FIG. 17 is a further enlarged end view of an alternate flexible disk shaft of FIG. 14;

FIG. 18 is a sectional view of the alternate flexible disk shaft of FIG. 17 taken along line 18—18;

FIG. 22 is an enlarged sectional view of the turbine rotor of FIG. 1;

DETAILED DESCRIPTION OF THE PREFERRED EMBODIMENTS

Figure 1:
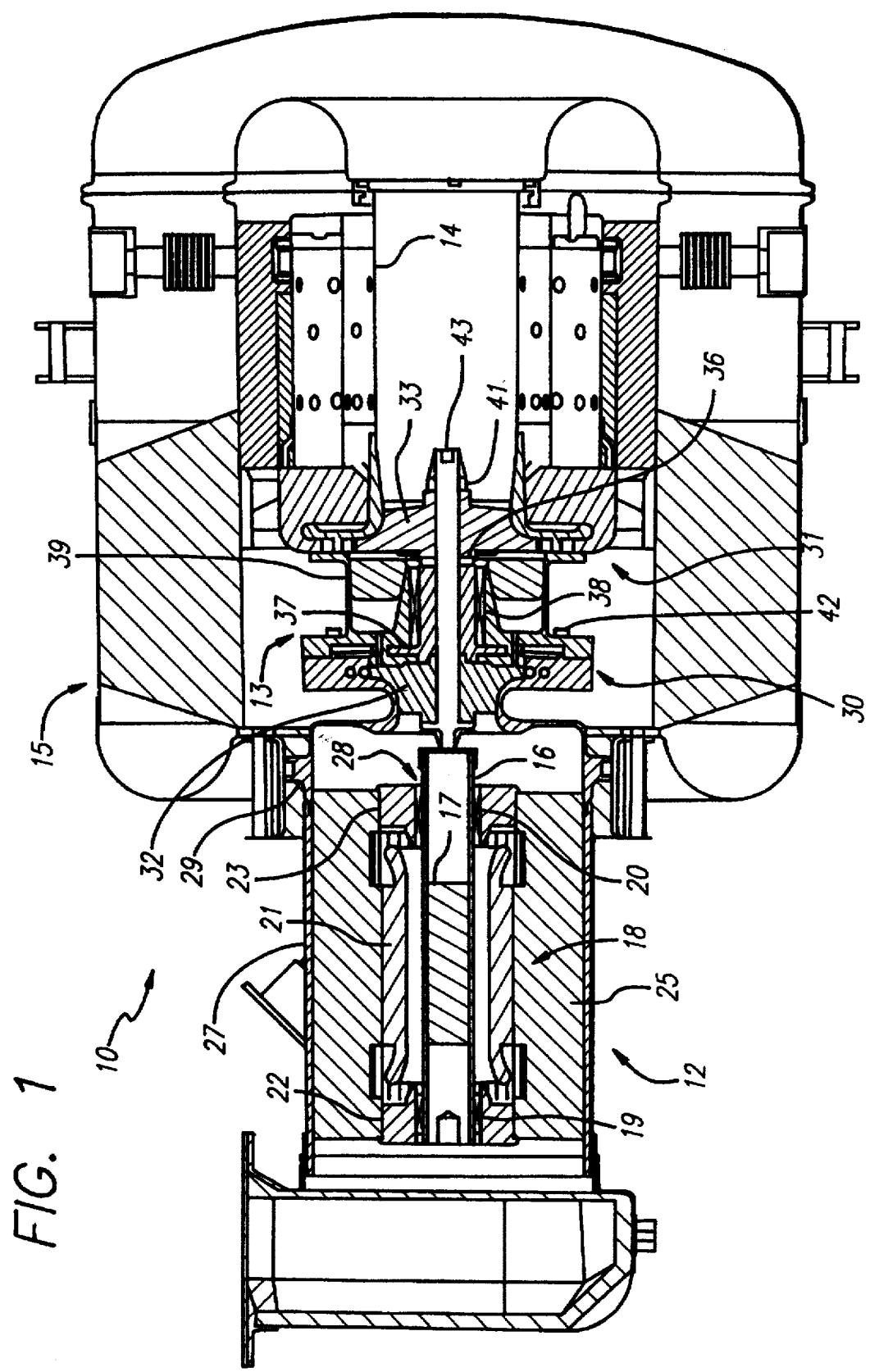
FIG. 1 is a sectional view of a turbomachine having the compound shaft of the present invention.

A permanent magnet turbogenerator 10 is illustrated in FIG. 1 as an example of a turbomachine utilizing the compound shaft of the present invention. The permanent magnet turbogenerator 10 generally comprises a permanent magnet generator 12, a power head 13, and a combustor 14.

The permanent magnet generator 12 includes a permanent magnet rotor or sleeve 16, having a permanent magnet 17 disposed therein, rotatably supported within a permanent magnet stator 18 by a pair of spaced journal bearings 19, 20. The permanent magnet stator 18 comprises permanent magnet electrical windings 21 disposed between permanent magnet stator ends 22, 23. Radial permanent magnet stator cooling fins 25 are enclosed in a cylindrical sleeve 27 to form an annular air flow passage to cool the permanent magnet stator 18 and thereby preheat the air passing through on its way to the power head 13.

The permanent magnet sleeve 16 and permanent magnet 17 collectively form the rotatable permanent magnet shaft 28 which is also referred to as the first stiff shaft. The permanent magnet 17 may be inserted into the permanent magnet sleeve 16 with a radial interference fit by any number of conventional techniques, including heating the permanent magnet sleeve 16 and supercooling the permanent magnet 17, hydraulic pressing, pressurized lubricating fluids, tapering the inside diameter of the permanent magnet sleeve 16 and/or the outer diameter of the permanent magnet 17, and other similar methods or combinations thereof.

The power head 13 of the permanent magnet turbogenerator 10 includes compressor 30 and turbine 31. The compressor 30 having compressor wheel 32, which receives preheated air from the annular air flow passage in cylindrical sleeve 27 around the permanent magnet stator 18, is driven by the turbine 31 having turbine wheel 33 which receives heated exhaust gases from the combustor 14 supplied by air from recuperator 15. The compressor wheel 32 and turbine wheel 33 are disposed on bearing rotor 36 having bearing rotor disk 37. The bearing rotor 36 is rotatably supported by a single journal bearing 38 within the power head housing 39 while the bearing rotor disk 37 is rotatably supported by a bi-directional thrust bearing with one element of the thrust bearing on either side of the bearing rotor disk 37. A transition structure 29 is welded to the cylindrical sleeve 27 and is bolted to the power head housing 39 by a plurality of spaced bolts 42.

The journal bearings 19, 20, and 38 would preferably be of the compliant foil hydrodynamic fluid film type of bearing, an example of which is described in detail in U.S. patent application Ser. No. 08/229,205 filed Apr. 18, 1994 by Robert W. Bosley, entitled "Compliant Foil Hydrodynamic Fluid Film Radial Bearing" issued Jun. 27, 1995 as U.S. Pat. No. 5,427,455 and is herein incorporated by reference. The thrust bearing would also preferably be of the compliant foil hydrodynamic fluid film type of bearing. An example of this type of bearing can be found in U.S. patent application Ser. No. 08/363,540 filed Dec. 23, 1994 by Robert W. Bosley, entitled "Compliant Foil Hydrodynamic Fluid Film Thrust Bearing" issued Jun. 25, 1996 as U.S. Pat. No. 5,529,398 and is also herein incorporated by reference.

Figure 2:
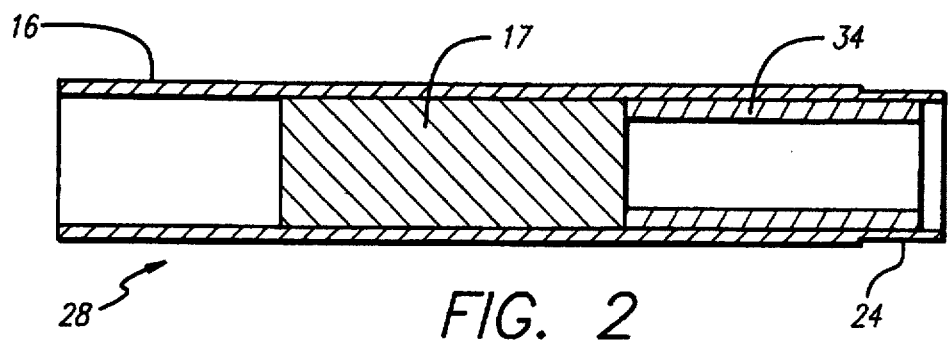
FIG. 2 is an enlarged sectional view of the permanent magnet shaft or first stiff shaft of the compound shaft of the turbomachine of FIG. 1.

The permanent magnet shaft 28 is shown enlarged in FIG. 2. The power head end 24 of the permanent magnet sleeve 16 may have a slightly smaller outer diameter than the outer diameter of the remainder of the permanent magnet sleeve 16. The permanent magnet sleeve 16, which may include an internal stiffening sleeve 34 at the power head end thereof, can be constructed of a material such as non-magnetic Inconel 718 steel, while the permanent magnet 17 may be constructed of a permanent magnet material such as samarium cobalt, neodymium-iron-boron or similar materials. In addition, cylindrical brass plugs (not shown) may be included at either end of the permanent magnet 17.

Figure 3:
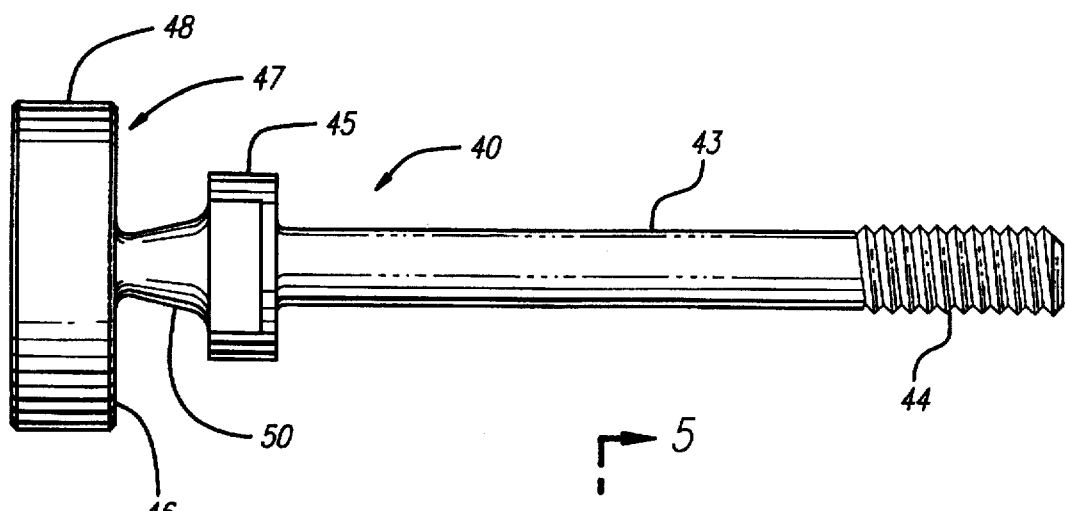
FIG. 3 is a plan view of the flexible disk shaft of the compound shaft of the turbomachine of FIG. 1.
Figure 4:
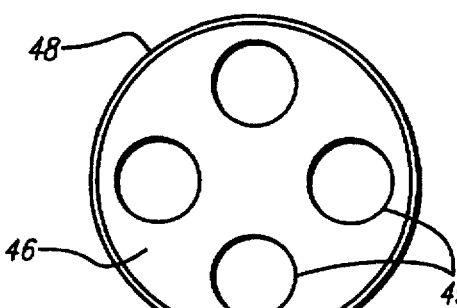
FIG. 4 is an end view of the flexible disk shaft of FIG. 3.
Figure 5:
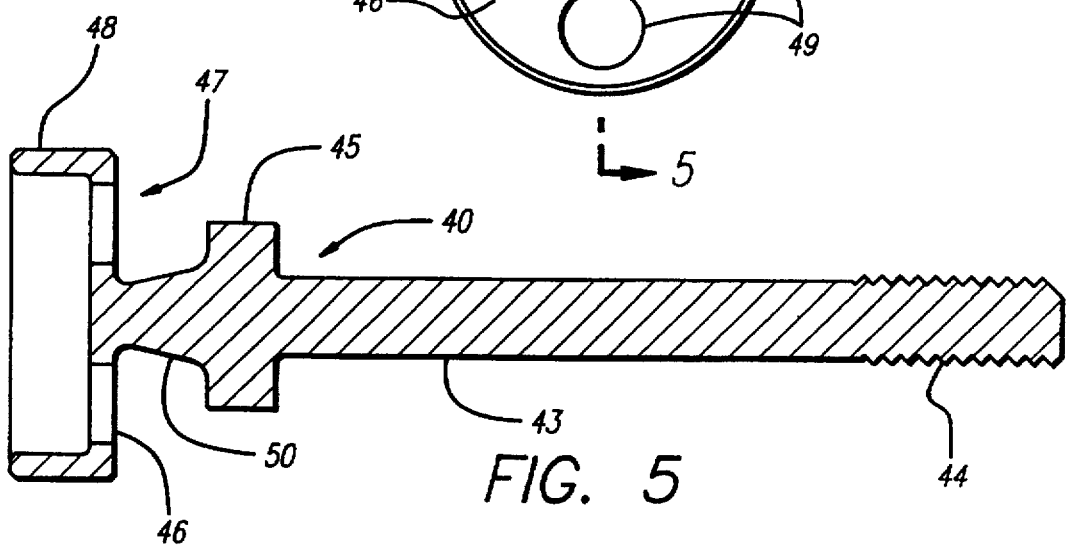
FIG. 5 is a sectional view of the flexible disk shaft of FIG. 4 taken along line 5—5.

The flexible disk shaft 40 is shown in the enlarged views of FIGS. 3–5. The flexible disk shaft 40 includes flexible disk member 47, a short tapered quill shaft 50 and a flange 45 at one end of tie rod 43. The opposite end 44 of the tie rod 43 is threaded to receive nut 41. The quill shaft 50 is tapered from the flange 45 to the flexible disk member 47.

The flexible disk member 47 is generally cup-shaped having the flexible disk 46 and cylindrical sides 48. The flexible disk 46 includes a plurality of spaced holes 49 extending therethrough. The size, number, and location of the holes 49 are selected to control the spring rate properties of the flexible disk 46 and thus insure soft trunnion spring rate characteristics and stiff radial translational spring rate characteristics normal to the compound shaft axis of rotation. The flexible disk 46 should generally not be radially stretched during the interference fit assembly onto the first stiff shaft since this would change the spring rate of the flexible disk 46 and the frequencies of the rotor criticals.

The permanent magnet shaft 28 of FIG. 2 and the flexible disk shaft 40 of FIGS. 3–5 are shown assembled in FIG. 6. The cylindrical sides 48 of the cup-shaped flexible disk member 47 of the flexible disk shaft 40 fit over the power head end 24 of the permanent magnet shaft 28 with an interference fit. By an interference fit is meant an interference of between 0.0002 and 0.005 inches.

As illustrated in FIG. 7, the hub 66 of the compressor wheel 32, bearing rotor 36 including bearing rotor disk 37, and the hub 67 of the turbine wheel 33, which collectively form the power head shaft 35, each includes a central bore and fits over the tie rod 43 of the flexible disk shaft 40. The power head shaft 35 is held in compression on the tie rod 43 by the nut 41.

Figure 8:
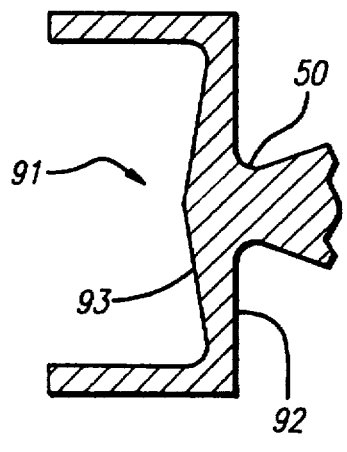
FIG. 8 is a sectional view of an alternate flexible disk member for the flexible disk shaft of FIGS. 3-5.
Figure 9:
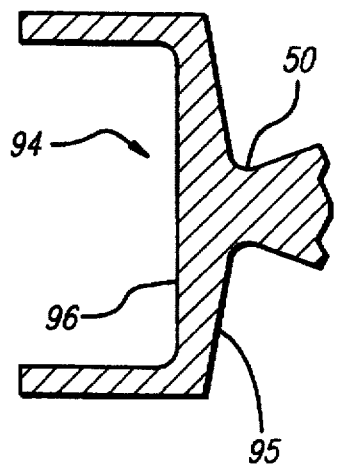
FIG. 9 is a sectional view of another alternate flexible disk member for the flexible disk shaft of FIGS. 3-5.
Figure 10:
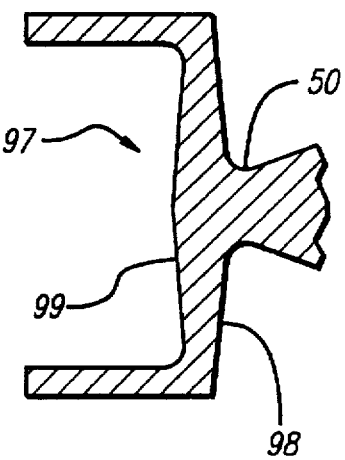
FIG. 10 is a sectional view of yet another alternate flexible disk member for the flexible disk shaft of FIGS. 3-5.

FIGS. 8–10 illustrate three alternate flexible disk members for the flexible disk shafts of FIGS. 3–5. In these embodiments, instead of establishing the flexibility of the flexible disk by providing holes or spiral slots through the disk, the thickness of the disk is increased from the cylindrical sides of the flexible disk member to the centerline of the disk. In FIG. 8, the disk 91 includes a flat outer surface 92 facing the quill shaft 50 and a tapered inner surface 93. In FIG. 9, the flexible disk 94 has a tapered outer surface 95 and a flat inner surface 96 while the flexible disk 97 of FIG. 10 has both the outer surface 98 and inner surface 99 tapered.

An alternate version of the compound shaft is illustrated in FIGS. 11–13. In this embodiment, the flexible disk shaft 51 includes flexible disk member 58 which interference fits inside the permanent magnet sleeve 53, including permanent magnet 54, as specifically shown in FIG. 11. The flexible disk member 58 includes flexible disk 64 and rim 59 with the disk 64 having a plurality of spiral slots 61 shown as four (4) in number. The tapered quill shaft 62 between the disk 64 and the flange 63 is elongated from that of the previously described version. The opposite end 57 of the tie rod 55, which supports the power head shaft 35, is threaded to receive the nut 41.

An alternate flexible disk shaft 72 is depicted in FIGS. 14–17. The flexible disk member 73 includes rim 74 and flexible disk 77 which has five (5) spiral slots 75. Each of the spiral slots 75 is generally of a constant width except for an enlarged end 76 at the rim 74 to relieve stress in that area. The quill shaft 82 between the flexible disk 77 and the flange 81 is still further elongated in this version of the flexible disk shaft 72. Tie rod 70 extends from the flange 81. While the flexible disk 58 member of FIGS. 11–13 is interference fit only a short distance into the permanent magnet sleeve 53, the flexible disk member 73 of FIGS. 14–16 is designed to interference fit at a greater depth into the permanent magnet sleeve 53 and to almost contact the permanent magnet 54. The axial position of the flexible disk member 73 will change the frequency of the compound shaft criticals and may require different balancing techniques depending upon how close the flexible disk member 73 is to the magnet 54. The inside diameter of the permanent magnet sleeve 53 can be slightly tapered to help the insertion of the flexible disk member 73 deep into the permanent magnet sleeve 53.

Either of the flexible disk members 58 or 73 may have a generally drum-shaped configuration as shown in FIGS. 17 and 18. This version of the flexible disk member, identified as 84, includes drum head 86 and sides 85 with the drum head 86 having a plurality (shown as four) spiral slots 87 each having a flared opening 88 at the sides 85 and extending a considerable distance along the sides 85. The outer diameter of the sides 85 may be slightly flared at the open end, as shown in FIG. 18, to facilitate insertion into the permanent magnet sleeve 53. The drum-shape can, however, be open at either end, that is, the open end can either face towards the permanent magnet 54 or away from the permanent magnet 54. The countersunk hole 90 at the center of the drum head 86 facilitates the transition of stresses into the web formed in the drum head 86 between the spiral slots 87.

Figure 19:
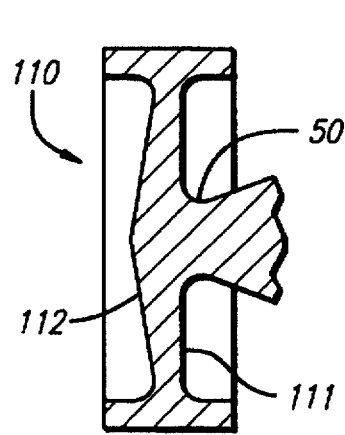
FIG. 19 is a sectional view of an alternate flexible disk member for the flexible disk shafts of FIGS. 11 and 14.
Figure 20:
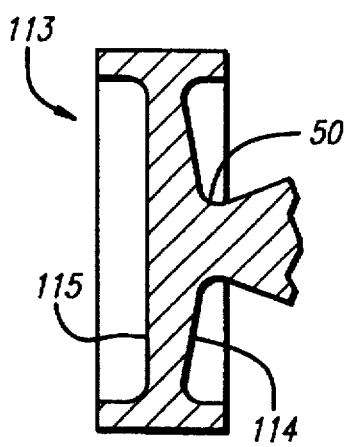
FIG. 20 is a sectional view of another alternate flexible disk member for the flexible disk shafts of FIGS. 11 and 14.
Figure 21:
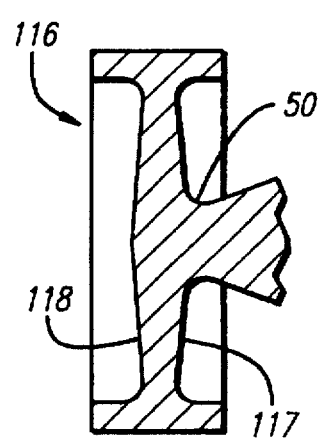
FIG. 21 is a sectional view of yet another alternate flexible disk member for the flexible disk shafts of FIGS. 11 and 14.

In addition, either of the flexible disk members 58 or 73 may have a flexible disk in which the thickness of the flexible disk is increased from the rim to the centerline of the disk as illustrated in FIGS. 19–21. In FIG. 19, the flexible disk 110 includes a flat surface 111 towards the quill shaft 50 and a tapered surface 112 away from the quill shaft 50. In FIG. 20, the flexible disk 113 has a tapered surface 114 towards the quill shaft 50 and a flat surface 115 away from the quill shaft 50 while in the flexible disk 116 of FIG. 21, both surfaces 117 and 118 are tapered.

FIG. 22 illustrates the turbine rotor 33 having an inertial ring 60 of increased mass at a radially outward position on the back plane of the rotor 33. This inertial ring 60 may be cast in place on the rotor 33 to provide increased mass in this area. Since the back plane of the rotor 33 is generally at or near a node of the first flexural critical, this increased mass at a radially extended position will provide gyroscopic stiffness at the node and increase the frequency of the first flexural critical.

Having described the various elements of the turbomachine including the compound shaft of the present invention, its assembly, installation, and performance will now be described. Thin brass disks are first bonded to each end of an unmagnetized samarium cobalt permanent magnet having a cylindrical shape and having a preferred magnetic axis normal to the cylinder's axis. The permanent magnet assembly with brass end pieces is then ground to obtain a precise outer diameter. It is then installed by thermal assembly techniques or other conventional means into the hollow permanent magnet sleeve which has an internal diameter that is slightly smaller than the permanent magnet assembly outer diameter. The resulting radial interference fit assures that the permanent magnet will not crack due to the tensile stresses that are induced when the permanent magnet assembly and permanent magnet sleeve experience rotationally induced gravitational fields when used in the turbomachine. The permanent magnet sleeve is longer than the permanent magnet assembly such that the permanent magnet sleeve has hollow ends when the permanent magnet assembly is installed therein. The internal stiffening sleeve is pressed with a radial interference fit into one of the hollow ends to stiffen the permanent magnet sleeve against bending induced by the first flexural critical mode of the compound shaft rotor assembly. The permanent magnet shaft assembly then has its outer surface contoured by grinding. It is then balanced as a component after which the permanent magnet is magnetized. The resulting permanent magnet shaft is a specific example of the first stiff shaft of the present invention. The flexible disk shaft is then pressed with an interference fit over the end of the first stiff shaft that has the internal stiffening sleeve.

A compliant foil hydrodynamic fluid film journal bearing is installed into the turbomachine's power head housing. Half of the bi-directional compliant foil hydrodynamic fluid film thrust bearing is attached to the face of the power head housing. The bearing rotor (with a rotating thrust disk) is installed into the journal bearing and abutted against the thrust bearing half mounted in or attached to the power head. The second half of the thrust bearing is installed in the power head assembly to enclose the thrust disk of the bearing rotor.

The compressor wheel is then attached to one end of the bearing rotor by arbor pressing the interference fit pilot diameters of the compressor wheel and bearing rotor. The turbine wheel is then attached to the other end of the bearing rotor by arbor pressing the interference fit pilot diameters of the turbine wheel and bearing rotor. This completes the assembly of the second stiff shaft and the power head less the compressor shroud and turbine shroud.

The permanent magnet motor/generator stator is installed with a radial interference fit into the stator cooling fin structure by thermal assembly techniques. The fin structure is installed with a radial interference fit into the motor/generator housing cylindrical sleeve by thermal assembly techniques. The bearing cartridge retainers (2) are installed with a radial interference fit into the fin structure by either thermal assembly techniques or by arbor/hydraulic press techniques. The compliant foil hydrodynamic fluid film journal bearings (2) are installed into the cartridge retainers by slip fit techniques and secured by a washer and a tapered snap ring. The assembled motor/generator housing with built in compressor shroud is then bolted to the power head assembly. The assembled first stiff shaft and flexible disk shaft is then inserted through the motor/generator housing and into the second stiff shaft (compressor, bearing rotor, turbine) and power head and secured in place with a nut to place the compressor, bearing rotor, and turbine in compression. The turbine shroud is then installed, followed by the combustor and recuperator (heat exchanger) which completes the turbomachine (turbogenerator) assembly.

The turbogenerator typically does not require assembly balancing. It may not even need to be checked to determine the state of rotor balance before being put into operation. Typically, when the turbomachine is operated, all the rigid body criticals are negotiated when the machine has accelerated above 20,000 rpm. The dimensionless damping constant Q (defined as resonant energy stored by a critical divided by resonant energy dissipated by damping per rotor rotation) for the last negotiated critical is typically only 2.3. The other negotiated criticals are typically damped even better. No flexural criticals need to be negotiated. The operating speed is 96,000 rpm. The first flexural critical speed is over 130,000 rpm.

Figure 23:
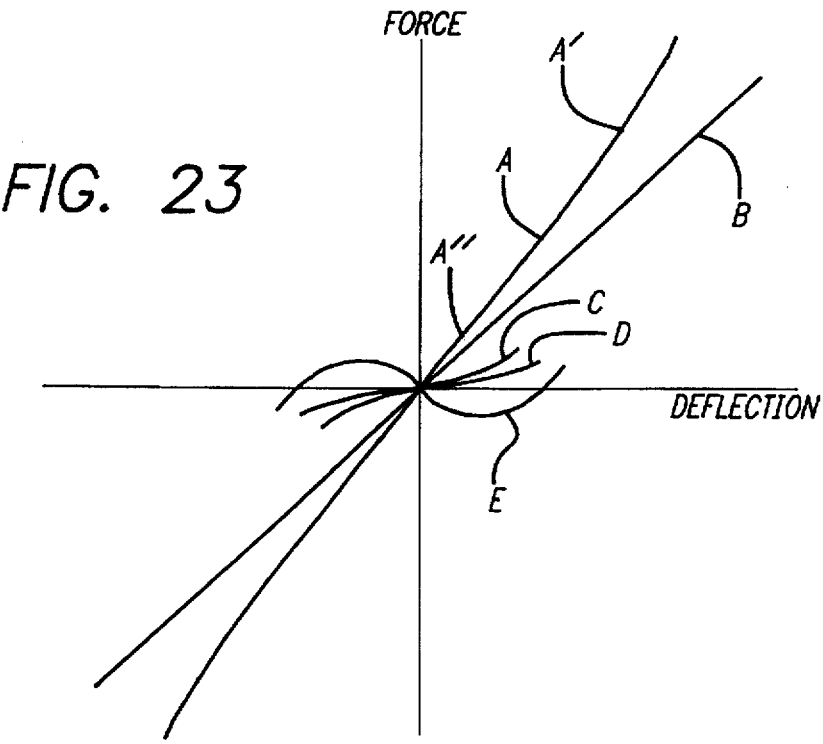
FIG. 23 is a graph of force vs deflection for the flexible disk shaft of the compound shaft of the present invention.

The graph of FIG. 23 is a plot of force in the y-axis vs deflection in the x-axis with line B representing a linear spring rate. Curve A includes section A" in which linear small deflection plate trunnion spring rate mechanisms dominate and section A' where the spring rate is dominated by non-linear large deflection plate trunnion and drum head tension mechanisms. Curves C, D, and E each illustrate buckling dominated spring rate mechanisms. Curve C represents a case with low radial compressive stress applied to the outer edge of the flexible disk with a resulting reduction in trunnion spring rate at low deflections. Curve D represents a case with medium compressive stress resulting in a barely positive spring rate. Curve E represents a case with high radial compressive stress resulting in a negative trunnion spring rate at low deflections. The alphabetical sequence of the curves represent decreasing positive spring rate. Increasing radial interference fit of the flexible disk rim in the permanent magnet sleeve increases compressive stresses directly and controls the bearing tolerance to misalignment and the rotor critical frequencies indirectly. A rotor critical dominated by the trunnion spring properties of a flexible disk shaft having negative spring rate will have a frequency of zero (the critical will disappear). While all of these curves are applicable to flexible disk shafts shown in FIGS. 11 and 14, only curves A & B apply to the flexible disk shaft shown in detail in FIGS. 3–5.

Figure 24A:
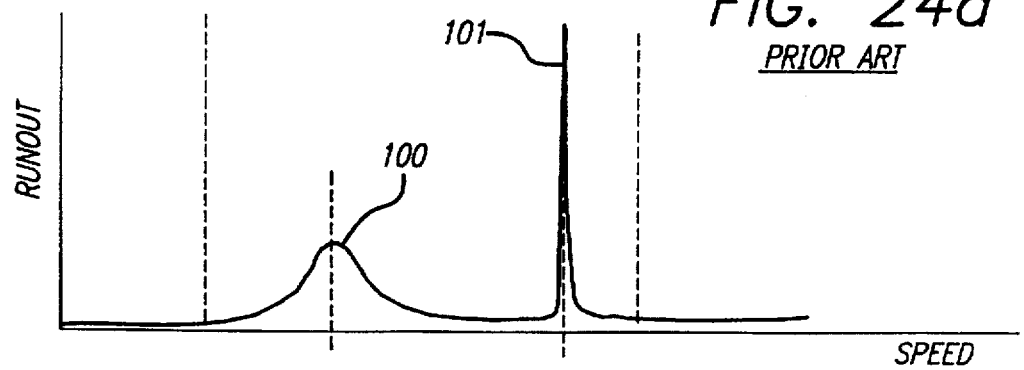
FIG. 24a is a plot of runout vs speed for a typical single piece shaft of the prior art.
Figure 24B:
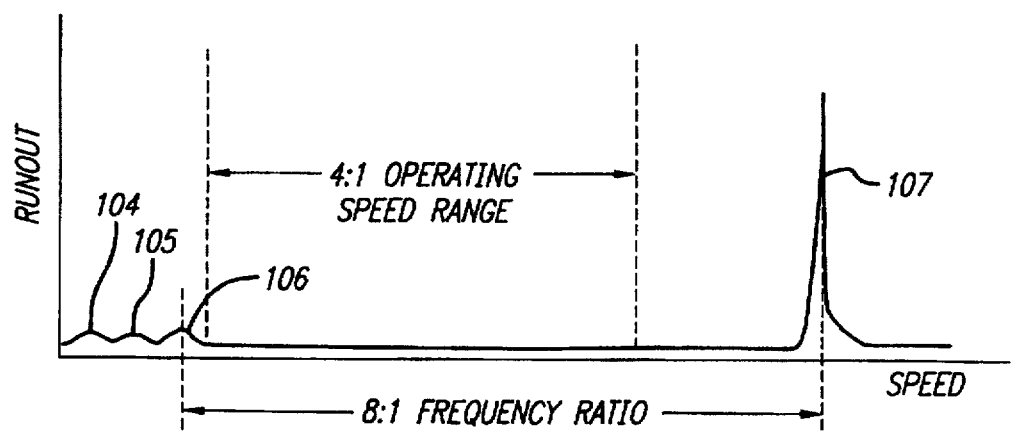
FIG. 24b is a plot of runout vs speed for the compound shaft of the present invention.
Figure 25:
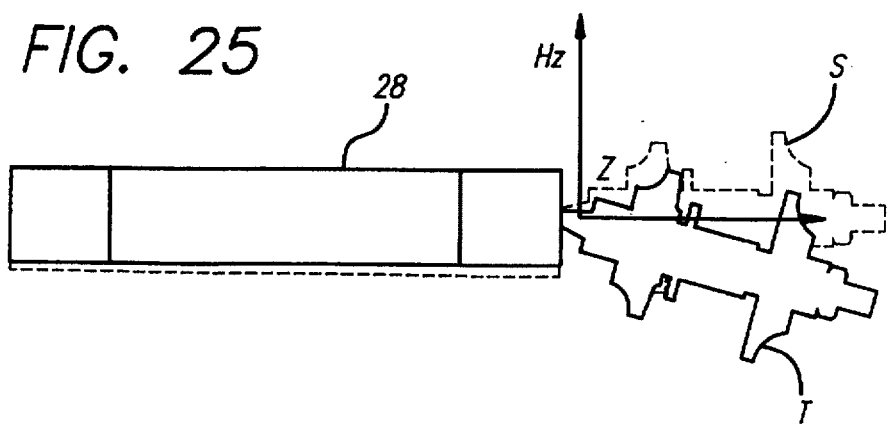
FIG. 25 is a computer representation illustrating the compound shaft of the present invention going through its first rigid body critical.

FIGS. 24a and 24b are each a plot of shaft runout in the vertical direction vs shaft speed in the horizontal direction. FIG. 24a represents a typical runout for a single piece unitary turbomachine shaft supported by two (2) journal bearings. Rigid body critical 100 and flexural critical 101 are both within the selected operating speed range for this typical turbomachine and will require considerable balancing and damping in order for the shaft to successfully negotiate them, particularly the flexural critical 101.

This is to be contrasted with the situation using the compound shaft of the present invention (FIG. 24b) where the first stiff shaft is supported by a pair of spaced journal bearings and the second stiff shaft, connected to the first stiff shaft by the flexible disk shaft, is supported by a single journal bearing. All three of the rigid body criticals 104, 105, and 106 are well damped and below the operating speed range. The flexural critical 107 occurs at a speed which is beyond the operating speed range of the turbomachine. The ratio of the speed of the flexural critical 107 to the highest rigid body critical is 8:1.

Figure 26:
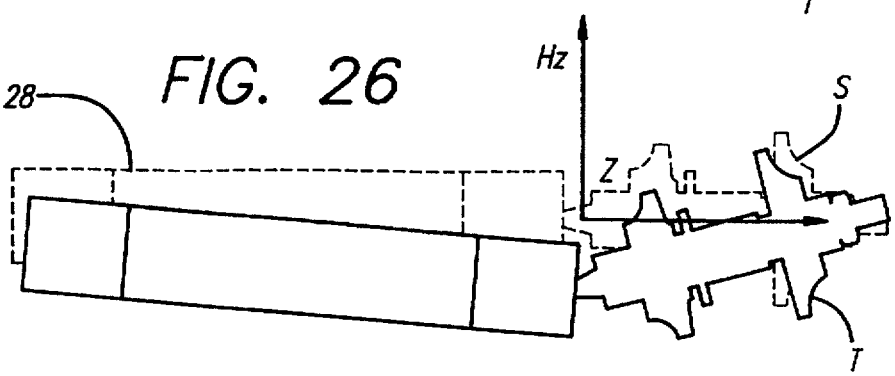
FIG. 26 is a computer representation illustrating the compound shaft of the present invention going through its second rigid body critical.
Figure 27:
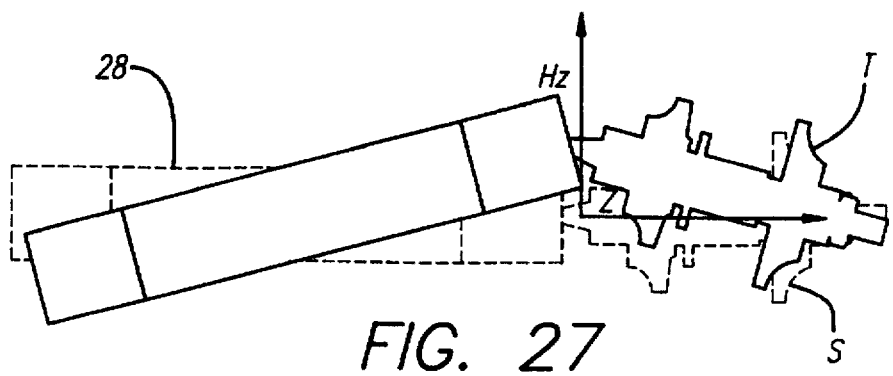
FIG. 27 is a computer representation illustrating the compound shaft of the present invention going through its third rigid body critical.
Figure 28:
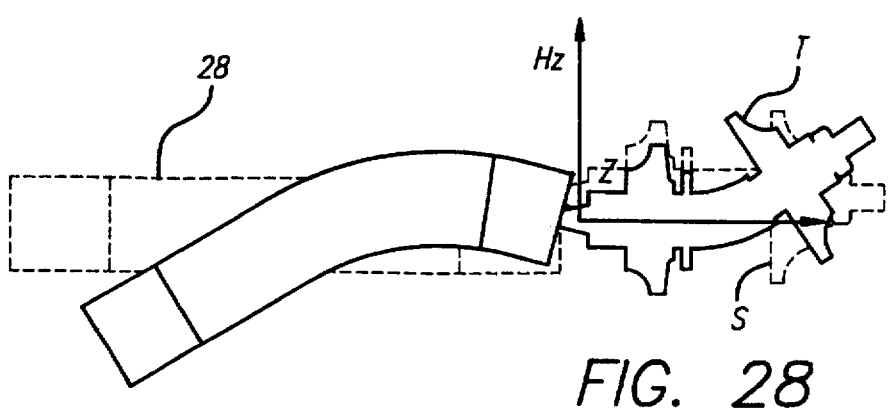
FIG. 28 is a computer representation illustrating the compound shaft of the present invention going through its first flexural critical.

FIGS. 25–28 are computer representations generally illustrating the criticals 104, 105, 106 and 107 of FIG. 24b. The first rigid body critical 104 of FIG. 25 has a low frequency of about 9000 rpm and a medium imbalance and runout defect level. The second rigid body critical 105 as shown in FIG. 26 would occur at about 14,000 rpm. The third rigid body critical 106 of FIG. 27 would occur at about 21,000 rpm. FIG. 28 illustrates that the first flexural critical which would occur at over 130,000 rpm. Each of these figures illustrate the static compound shaft, position S, and the compound shaft displaced at the speed of the critical, position T. While the first and second shafts are described as rigid or stiff, this is a relative term and is only true below the first flexural critical. At the high speeds of the first flexural critical, bending of these two shafts does occur as is graphically shown in FIG. 28.

The flexure of the connecting structure between the first and second stiff shafts, namely the flexible disk shaft, prevents either stiff shaft from delivering a moment to the other stiff shaft. The first stiff shaft does not sense or know that there is in fact a second stiff shaft. The second stiff shaft thinks that it is integrally connected to the power head end journal bearing of the first stiff shaft. The power head shaft journal bearing and the power head end journal bearing of the permanent magnet or first stiff shaft in essence support the power head shaft and prevent overturning motion and robbing of the rotor.

The compound shaft of the present invention provides for tuning or shifting of the rotor's rigid body and flexural critical frequencies. This provides flexibility in selecting the operating speed range of the turbomachine shaft. In most cases, a wide operating range is desirable over which there should be a no rigid body or flexural criticals that need to be negotiated during normal operation. This spread is achieved by lowering the rigid body critical frequencies and increasing the first flexural critical frequency. There are a number of factors which can affect frequencies of the rigid body criticals and the frequency of the first flexural critical. The length of the quill shaft between the flexible disk member and the flange on the flexible disk shaft, for example, can significantly affect the frequency of the first flexural critical; the shorter the quill shaft, the higher the frequency. The internal stiffening sleeve in the first stiff shaft rotor sleeve can increase the frequency of the first flexural critical by over 8,000 rpm. The number, type, size, and location of the holes or slots in the flexible disk or the variations in thickness in the flexible disk control the spring rate in the compound shaft, bearing tolerance to misalignment, and the frequencies of the rigid body criticals.

While specific embodiments of the present invention have been illustrated and described, it is to be understood that these are provided by way of example only. While the compound shaft has been particularly described for use in a permanent magnet turbogenerator, it should be recognized that the compound shaft of the present invention is applicable to any turbomachine or rotating machine which can utilize or requires a compound shaft. The invention is not to be construed as being limited thereto but only by the proper scope of the following claims.

What I claim is:

1. A compound shaft comprising:
   a first stiff shaft;
   a flexible disk shaft having a flexible disk, a quill shaft, and a tie rod, said quill shaft disposed between and connecting said flexible disk and said tie rod, said flexible disk of said flexible disk shaft interference fit with said first stiff shaft; and
   a second stiff shaft removably disposed on the tie rod of said flexible disk shaft.

2. The compound shaft of claim 1 wherein said flexible disk of said flexible disk shaft has soft trunnion spring rate characteristics and stiff radial translation spring rate characteristics normal to the compound shaft axis.

3. The compound shaft of claim 2 wherein said flexible disk of said flexible disk shaft has a thickness which decreases radially outwardly from the centerline of said flexible disk.

4. The compound shaft of claim 2 wherein said flexible disk of said flexible disk shaft includes a plurality of spaced holes.

5. The compound shaft of claim 4 wherein said flexible disk of said flexible disk shaft includes a plurality of spaced spiral slots.

6. The compound shaft of claim 5 wherein said spaced spiral slots extend radially outwardly at their base.

7. The compound shaft of claim 5 wherein said spaced spiral slots include an enlarged flared opening at their radially outward end.

8. The compound shaft of claim 5 wherein said spaced spiral slots extend radially outwardly at their base and include an enlarged flared opening at their radially outward end.

9. The compound shaft of claim 1 wherein said flexible disk of said flexible disk shaft is generally cup-shaped and interference fits over one end of said first stiff shaft.

10. The compound shaft of claim 9 wherein said one end of said first stiff shaft has an outer diameter slightly reduced from the outer diameter of the remainder of said first stiff shaft to receive the generally cup-shaped flexible disk of said flexible disk shaft over the slightly reduced outer diameter end of said first stiff shaft.

11. The compound shaft of claim 1 wherein said compound shaft is for a permanent magnet turbogenerator and said first stiff shaft is a cylindrical sleeve enclosing a permanent magnet of said permanent magnet turbogenerator and said second stiff shaft is a power head shaft of said turbogenerator mounted in compression on said tie bar of said flexible disk shaft.

12. The compound shaft of claim 11 wherein an inertial ring of increased mass is provided axially near a node of the first flexural critical of said compound shaft.

13. The compound shaft of claim 12 wherein said inertial ring of increased mass is provided radially outwardly on the back plane of said turbine wheel facing said compressor wheel.

14. The compound shaft of claim 11 wherein said cylindrical sleeve includes an internal stiffening sleeve inside said end of said cylindrical sleeve operably connected to said flexible disk shaft.

15. The compound shaft of claim 11 wherein said quill shaft of said flexible disk shaft is tapered from said second stiff shaft to said flexible disk.

16. The compound shaft of claim 1 wherein said flexible disk of said flexible disk shaft is interference fit into said end of said first stiff shaft.

17. The compound shaft of claim 16 wherein said flexible disk of said flexible disk shaft is interference fit shallow into said first stiff shaft.

18. The compound shaft of claim 16 wherein said flexible disk of said flexible disk shaft is interference fit deep into said first stiff shaft.

19. The compound shaft of claim 16 wherein said flexible disk of said flexible disk shaft has a thickness which decreases radially outwardly from the centerline of said flexible disk.

20. A compound shaft comprising:
    a first stiff shaft;
    a second stiff shaft; and
    a flexible disk shaft having a generally cup-shaped flexible disk, a tie rod, and a tapered quill shaft connecting said generally cup-shaped flexible disk and said tie rod, said generally cup-shaped flexible disk of said flexible disk shaft interference fit over one end of said first stiff shaft, and said tie rod removably mounting said second stiff shaft.

21. The compound shaft of claim 20 wherein said first stiff shaft is a cylindrical sleeve having an internal stiffening sleeve inside said one end of said first stiff shaft.

22. A compound shaft comprising:
    a first shaft having a hollow sleeve at one end thereof;
    a second shaft; and
    a flexible disk shaft having a flexible disk, a tapered quill shaft, and a tie rod, said quill shaft disposed between and connecting said flexible disk and said tie rod, said flexible disk of said flexible disk shaft interference fit into the hollow sleeve end of said first stiff shaft and said tie rod removably mounting said second stiff shaft.

23. The compound shaft of claim 22 wherein said flexible disk of said flexible disk shaft is interference fit shallow into said sleeve of said first stiff shaft.

24. The compound shaft of claim 22 wherein said flexible disk of said flexible disk shaft is interference fit deep into said sleeve of said first stiff shaft.

25. The compound shaft of claim 22 wherein said first stiff shaft is a cylindrical sleeve having an internal stiffening sleeve inside said one end of said first stiff shaft.

26. A compound shaft for a permanent magnet turbogenerator, said compound shaft comprising:
    a flexible disk shaft including a generally cup-shaped flexible disk member, a tie rod, and a tapered quill shaft connecting said generally cup-shaped flexible disk member and said tie rod, a flange at the tapered quill shaft end of said tie rod, and a threaded nut at the other end of said tie rod; and
    said permanent magnet turbogenerator having a permanent magnet shaft including a permanent magnet disposed within a permanent magnet sleeve rotatably supported by a pair of spaced compliant foil hydrodynamic fluid film journal bearings within a permanent magnet stator, and a power head shaft including a compressor wheel, a bearing rotor, and a turbine wheel rotatably supported by a single compliant foil hydrodynamic fluid film journal bearing and a bi-directional compliant foil hydrodynamic fluid film thrust bearing within a compressor and turbine housing,
    said generally cup-shaped flexible disk member of said flexible disk shaft interference fit over one end of said permanent magnet sleeve and said power head shaft removably disposed on the tie rod of said flexible disk shaft and held in compression between said flexible disk shaft flange and said threaded nut.

27. The compound shaft of claim 26 wherein said turbine wheel includes an inertial ring of increased mass on the back plane thereof facing said compressor wheel.

28. The compound shaft of claim 26 wherein said permanent magnet sleeve includes an internal stiffening sleeve inside one end of said permanent magnet sleeve.

29. A compound shaft for a permanent magnet turbogenerator, said compound shaft comprising:
    a flexible disk shaft including a flexible disk member, a tie rod, and a tapered quill shaft connecting said flexible disk member and said tie rod, a flange at the tapered quill shaft end of said tie rod, and a threaded nut at the other end of said tie rod; and
    said permanent magnet turbogenerator including a permanent magnet shaft having a permanent magnet disposed within a permanent magnet sleeve rotatably supported by a pair of spaced compliant foil hydrodynamic fluid film journal bearings within a permanent magnet stator, and a power head shaft having a compressor wheel, a bearing rotor, and a turbine wheel rotatably supported by a single compliant foil hydrodynamic fluid film journal bearing and a bi-directional compliant foil hydrodynamic fluid film thrust bearing within a turbine and compressor housing,
    said flexible disk member of said flexible disk shaft interference fit into one end of said permanent magnet sleeve and said power head shaft removably disposed on the tie rod of said flexible disk shaft and held in compression between said flexible disk shaft flange and said threaded nut.

30. The compound shaft of claim 29 wherein said turbine wheel includes inertial ring of increased mass on the back plane thereof facing said compressor wheel.

31. The compound shaft of claim 29 wherein said permanent magnet sleeve includes an internal stiffening sleeve inside said one end of said permanent magnet sleeve.

32. The compound shaft of claim 29 wherein said flexible disk member is generally cup-shaped with the open end thereof facing toward said permanent magnet of said permanent magnet sleeve.

33. The compound shaft of claim 29 wherein said flexible disk member is generally cup-shaped with the open end thereof facing away from said permanent magnet of said permanent magnet sleeve.

34. A compound shaft for a permanent magnet turbogenerator, said compound shaft comprising:
    a flexible disk shaft including a generally cup-shaped flexible disk member, a tie rod, and a short tapered quill shaft connecting said generally cup-shaped flexible disk and said tie rod, a flange at the short tapered quill shaft end of said tie rod, and a threaded nut at the other end of said tie rod, said generally cup-shaped flexible disk member having a thickness which decreases radially outwardly from the centerline of said flexible disk member; and
    said permanent magnet turbogenerator including a permanent magnet shaft having a permanent magnet disposed within a permanent magnet sleeve rotatably supported by a pair of spaced compliant foil hydrodynamic fluid film journal bearings within a permanent magnet stator, and said permanent magnet sleeve including an internal stiffening sleeve inside one end thereof, said permanent magnet turbogenerator also including a power head shaft having a compressor wheel, a bearing rotor, and a turbine wheel rotatably supported by a single compliant foil hydrodynamic fluid film journal bearing and a bi-directional compliant foil hydrodynamic fluid film thrust bearing within a compressor and turbine housing, said generally cup-shaped flexible disk member of said flexible disk shaft interference fit over the end of said permanent magnet sleeve including the internal stiffening sleeve therein and said power head shaft removably disposed on the tie rod of said flexible disk shaft and held in compression between said flexible disk shaft flange and said threaded nut, said turbine wheel including an inertia ring of increased mass on the back plane thereof facing said compressor wheel.

35. A compound shaft for a permanent magnet turbogenerator, said compound shaft comprising:

a flexible disk shaft including a generally cup-shaped flexible disk member, a tie rod, and a tapered quill shaft connecting said generally cup-shaped flexible disk member and said tie rod, a flange at the tapered quill shaft end of said tie rod, and a threaded nut at the other end of said tie rod; and said permanent magnet turbogenerator having a permanent magnet rotor rotatably supported by a pair of spaced compliant foil hydrodynamic fluid film journal bearings within a permanent magnet stator, said permanent magnet rotor having a permanent magnet disposed within a permanent magnet sleeve with the outer surface of said permanent magnet sleeve serving as both the outer surface of the permanent magnet rotor and as the rotating element supported by said pair of spaced compliant foil hydrodynamic fluid film journal bearings within said permanent magnet stator, said permanent magnet turbogenerator also having a power head shaft including a compressor wheel, a bearing rotor, and a turbine wheel rotatably supported by a single compliant foil hydrodynamic fluid film journal bearing and a bi-directional compliant foil hydrodynamic fluid film thrust bearing within a compressor and turbine housing, said generally cup-shaped flexible disk member of said flexible disk shaft interference fit over one end of said permanent magnet sleeve and said power head shaft removably disposed on the tie rod of said flexible disk shaft and held in compression between said flexible disk shaft flange and said threaded nut.

36. A compound shaft for a permanent magnet turbogenerator, said compound shaft comprising:

a flexible disk shaft having a flexible disk, a tie rod, and a tapered quill shaft connecting said flexible disk and said tie rod; and said permanent magnet turbogenerator having a permanent magnet rotor including a permanent magnet disposed within a permanent magnet sleeve, and a permanent magnet stator housing including a pair of spaced journal bearings to rotatably support said permanent magnet rotor, said permanent magnet turbogenerator also having a power head shaft including a compressor wheel, a bearing rotor, a turbine wheel, and a compressor and turbine housing including a single journal bearing and a bi-directional thrust bearing to rotatably support said compressor wheel, said bearing rotor, and said turbine wheel, said flexible disk of said flexible disk shaft interference fit with one end of said permanent magnet sleeve and said power head shaft removably mounted on the tie rod of said flexible disk shaft.

37. The compound shaft of claim 36 wherein said journal bearings are compliant foil hydrodynamic fluid film bearings.

38. The compound shaft of claim 36 wherein said bi-directional thrust bearing is a compliant foil hydrodynamic fluid film bearing.

39. A compound shaft comprising:

a first stiff shaft;

a second stiff shaft; and a flexible disk shaft having a generally cup-shaped flexible disk, a tie rod, and a tapered quill shaft disposed between and connecting said generally cup-shaped flexible disk and said tie rod, said generally cup-shaped flexible disk of said flexible disk shaft interference fit with one end of said first stiff shaft, and said tie rod removably mounting said second stiff shaft.

40. The compound shaft of claim 39 wherein said flexible disk of said flexible disk shaft is interference fit into said end of said first stiff shaft.

41. The compound shaft of claim 40 wherein said flexible disk of said flexible disk shaft is interference fit shallow into said first stiff shaft.

42. The compound shaft of claim 40 wherein said flexible disk of said flexible disk shaft is interference fit deep into said first stiff shaft.

43. A compound shaft for a permanent magnet turbogenerator, said compound shaft comprising:

a flexible disk shaft having a generally cup-shaped flexible disk, a tie rod, and a tapered quill shaft connecting said generally cup-shaped flexible disk and said tie rod, a flange at the tapered quill shaft end of said tie rod, and a threaded nut at the other end of said tie rod; and said permanent magnet turbogenerator including a permanent magnet rotor having a permanent magnet disposed within a permanent magnet sleeve rotatably supported by a pair of spaced compliant foil hydrodynamic fluid film journal bearings within a permanent magnet stator, said permanent magnet turbogenerator also having a power head shaft including a compressor wheel, a bearing rotor, and a turbine wheel rotatably supported by a single compliant foil hydrodynamic fluid film journal bearing and a bi-directional compliant foil hydrodynamic fluid film thrust bearing within a compressor and turbine housing, said generally cup-shaped flexible disk of said flexible disk shaft interference fit with one end of said permanent magnet sleeve and said power head shaft removably disposed on the tie rod of said flexible disk shaft and held in compression between said flexible disk shaft flange and said threaded nut.

44. The compound shaft of claim 43 wherein said flexible disk of said flexible disk shaft is interference fit into said end of said permanent magnet sleeve.

45. The compound shaft of claim 44 wherein said flexible disk of said flexible disk shaft is interference fit shallow into said permanent magnet sleeve.

46. The compound shaft of claim 44 wherein said flexible disk of said flexible disk shaft is interference fit deep into said permanent magnet sleeve.

47. A compound shaft for a permanent magnet turbogenerator, said compound shaft comprising:

a flexible disk shaft having a generally cup-shaped flexible disk, a tie rod, and a tapered quill shaft connecting said generally cup-shaped flexible disk and said tie rod, a flange at the tapered quill shaft end of said tie rod, and a threaded nut at the other end of said tie rod; and said permanent magnet turbogenerator having a permanent magnet stator including a pair of spaced compliant foil hydrodynamic fluid film journal bearings to rotatably support a permanent magnet rotor including a permanent magnet disposed within a permanent magnet sleeve with the outer surface of said permanent magnet sleeve serving as both the outer surface of the permanent magnet rotor and as the rotating element supported by said pair of spaced compliant foil hydrodynamic fluid film journal bearings, said permanent magnet turbogenerator also having a power head shaft including a compressor wheel, a bearing rotor, a turbine wheel, and a compressor and turbine housing including a single compliant foil hydrodynamic fluid film journal bearing and a bi-directional compliant foil hydrodynamic fluid film thrust bearing to rotatably support said compressor wheel, said bearing rotor, and said turbine wheel, said generally cup-shaped flexible disk of said flexible disk shaft interference fit with one end of said permanent magnet sleeve and said power head shaft removably disposed on the tie rod of said flexible disk shaft and held in compression between said flexible disk shaft flange and said threaded nut.

48. The compound shaft of claim 47 wherein said flexible disk of said flexible disk shaft is interference fit into said end of said permanent magnet sleeve.

49. The compound shaft of claim 48 wherein said flexible disk of said flexible disk shaft is interference fit shallow into said permanent magnet sleeve.

50. The compound shaft of claim 48 wherein said flexible disk of said flexible disk shaft is interference fit deep into said permanent magnet sleeve.

* * * * *

UNITED STATES PATENT AND TRADEMARK OFFICE
CERTIFICATE OF CORRECTION

PATENT NO : 5,697,848
DATED : December 16, 1997
INVENTOR(S) : Robert W. Bosley

It is certified that error appears in the above-identified patent and that said Letters Patent is hereby corrected as shown below:

Column 6, line 6, change "fast" to --first--
Column 13, line 47, change "robbing" to --rubbing--
Claim 5, line 1, change "4" to --2--

Signed and Sealed this

Twenty-fourth Day of February, 1998

*Attest:*

BRUCE LEHMAN

*Attesting Officer*     Commissioner of Patents and Trademarks